United States Patent [19]

Poth et al.

[11] 4,302,656

[45] Nov. 24, 1981

[54] CONTROLLING THE OPERATIONS OF AN ELECTRIC ARC WELDER

[75] Inventors: Leonhard Poth, Pullach; Peter Hildebrandt, Kranzberg; Rudolf Pawlik, Wolfratshausen; Horst Klett, Munich, all of Fed. Rep. of Germany

[73] Assignee: Linde Aktiengesellschaft, Wiesbaden, Fed. Rep. of Germany

[21] Appl. No.: 96,493

[22] Filed: Nov. 21, 1979

Related U.S. Application Data

[63] Continuation of Ser. No. 871,483, Jan. 23, 1978, abandoned.

[30] Foreign Application Priority Data

Jan. 26, 1977 [DE] Fed. Rep. of Germany ....... 2703113

[51] Int. Cl.³ .............................................. B23K 9/10
[52] U.S. Cl. ........................ 219/137 PS; 219/124.02; 219/130.31
[58] Field of Search ...................... 219/124.02, 130.31, 219/137 PS

[56] References Cited

U.S. PATENT DOCUMENTS

| | | | |
|---|---|---|---|
| 3,426,175 | 2/1969 | Hahne | 219/124.02 |
| 3,511,966 | 5/1970 | Bone | 219/130.31 |
| 4,015,101 | 3/1977 | Hannappel et al. | 219/124.02 |

*Primary Examiner*—C. C. Shaw
*Attorney, Agent, or Firm*—Karl F. Ross

[57] ABSTRACT

The power (performance) of an electric arc welder is controlled in dependence upon the changes in the level of the pool of weldment with respect to the level of the adjoining surfaces of the workpiece. The level of the pool of weldment is detected by measuring the arc voltage and, in accordance with the invention, the distance between the end of the fusible electrode and the level of the workpiece upper surfaces adjoining the pool is maintained constant.

3 Claims, 1 Drawing Figure

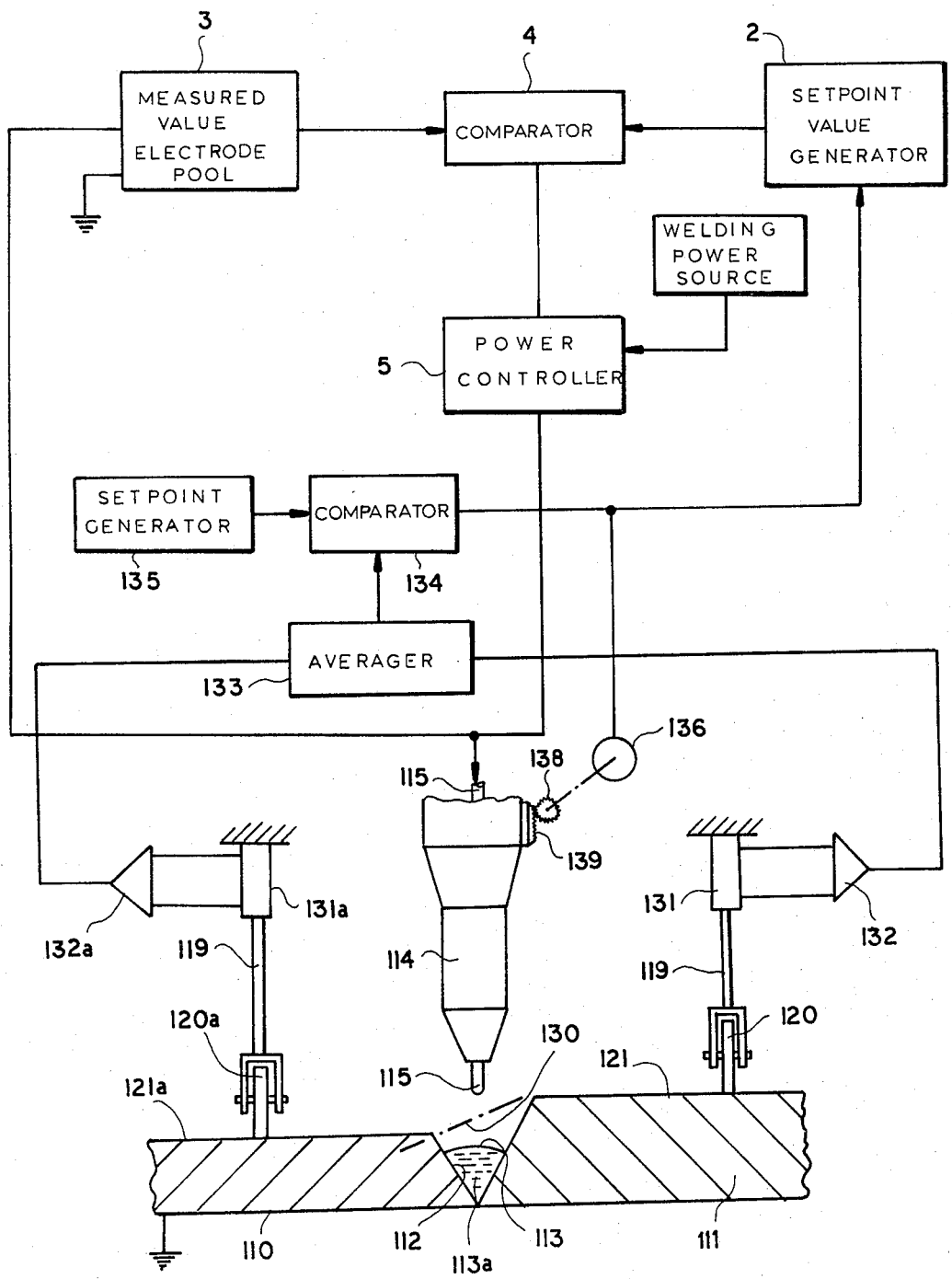

CONTROLLING THE OPERATIONS OF AN ELECTRIC ARC WELDER

CROSS REFERENCE TO RELATED APPLICATION

This application is a continuation in part of Ser. No. 871,483 filed Jan. 23, 1978, now abandoned.

FIELD OF THE INVENTION

The present invention relates to a method of and to a device for controlling the operation of a deposition-type arc-welding apparatus and, more particularly, the power of an arc-welding burner.

BACKGROUND OF THE INVENTION

In deposition-type arc-welding systems, an arc-welding burner fuses a consumable electrode and deposits the weld material in a pool in the gap between a pair of workpieces which generally are deposited horizontally so that the upper surface of the pool, as it is formed, is at a distance from the end of the welding electrode. This space or gap is spanned by the welding arc.

In welding technology it is known to use the arc voltage as a measured-value input or signal for the voltage control of the distance between the electrode end and the upper surface of the pool so as to maintain this distance constant, effecting high welding speed with the formation of the weld bead or seam as uniformly as possible.

This is accomplished by changing the distance between the electrode end and the upper surface of the pool of weldment with a change in the measured value of the arc voltage, the position of the electrode end being modified accordingly to restore the set-point value of the spacing.

This system has, it has been found, the disadvantage that the spacing between the electrode end and the upper surface of the pool is maintained constant by lowering the electrode end toward the pool when the level of the upper surface of the weldment pool falls with respect to the upper surface of the workpieces flanking the pool. In other words, if the pool of weldment is formed in the crevice between juxtaposed edges of the two workpieces, and the surface of the pool of weldment falls within this crevice and hence the distance between the upper surfaces of the workpiece adjacent the crevice and the upper surface of the pool increases, the automatic control means previously described maintains the spacing between the electrode end and the upper surface of the pool by lowering the electrode end. While this succeeds in maintaining substantially constant the weld performance or welding power of the weling burner, it results in a weld seam which tends to become thinner progressively with an increasing depth of the root of the crevice or widening of the latter. Ultimately, the weld will break through the underside of the crevice.

Such a breakthrough during the welding process has been prevented heretofore by supporting the pool of wledment below the crevice with a metal plate or a like pool support. Naturally, the need to provide for such an additional support to prevent breakthrough is time-consuming and, indeed, the use of such support may not even be possible in many cases, e.g. because of the nature of the workpiece to be welded.

Naturally, it is difficult to ensure extremely small tolerances of the end faces of a pair of workpieces which are to be joined together by deposit welding so as to avoid all variations in the level of the welding pool, for a constant rate of deposition, relative to the upper surfaces of the workpieces adjoining the welding crevice.

As prior art which may be material to the present application, reference may be made to U.S. Pat. No. 3,511,966, No. 1,826,186 and No. 3,426,175, to Russian Pat. No. 322,247 and No. 335,055 and to German Pat. No. 1,957,508.

OBJECT OF THE INVENTION

It is the principal object of the present invention to provide a method of controlling the performance of an arc-welding weld-deposition burner of the aforedescribed type which can prevent burn-through of the welding crevice without the use of a backing plate or other special pool support and which thus can result in a high-quality uniform welding and exceptionally high welding speeds.

It is another object of this invention to provide an improved apparatus or device for controlling weld performance.

SUMMARY OF THE INVENTION

It has now been found that the backing or support plate hitherto deemed to be essential for the deposit welding with a pool of weldment in a crevice between two workpieces to form a horizontal welding seam can be eliminated entirely while the power of the welding burner is controlled to yield a highly uniform deposit weld by, in the context of a system for controlling the performance of a deposit-type arc welding burner in dependence upon the spacing between the electrode end and the upper surface of the pool, maintaining constant the distance between the electrode end and the plane or level of the upper surfaces of the workpiece adjoining the pool or the crevice in which the pool is deposited.

Thus it is an essential feature of the present invention that, in the deposition welding of two workpieces together by the deposit of a pool of weldment by a welding burner having an electrode end, the distance between the electrode end and the level of the upper surfaces of the workpieces adjoining the crevice is maintained constant.

The invention is applicable to all types of deposition welding in which a weldment is fused by an electric arc and deposited in a pool in a crevice formed between two workpieces. Specifically it applies to a tungsten inert-gas (TIG) welding in which the end of the nonconsumable electrode is positoned relative to the pool of weldment and a consumable electrode is fed to the arc for melting for form the pool.

By holding constant the distance between the electrode end and the plane of the workpiece upper surfaces adjoining the crevice or pool, in accordance with the key feature of the present invention, it is possible to assure that a change in the level of the upper surface of the pool with respect to the mean position of the upper surfaces of the workpiece adjoining the pool will result in a change in the length of the arc and thus result in a change in the arc voltage serving as the measured-value input for the power of the welding burner.

Advantageously, therefore, with an increase in the arc length and voltage, as a result of the fact that the distance between the electrode and the pool-adjoining upper surface of the workpiece is held constant, the drop in the level of the pool upper surface relative to the adjoining upper surfaces of the workpiece is detected and the power of the welding burner is reduced to preclude burnthrough at the root of the crevice.

According to a further feature of the invention, the change in the electric-art voltage serves as the measured-value signal for controlling the welding parameters. It has been found to be particularly desirable to use this measured-value signal for the control of the welding current amplitude. Naturally, the signal can be used to control other welding parameters such as the welding speed, i.e. the rate of advance of the welding burner along the weld seam or vice versa, or the welding-wire feed velocity.

Naturally, the spacing between the nonconsumable electrode and the mean between the pool-adjoining surfaces can be maintained constant by a feedback or electrical control circuit.

An apparatus for carrying out the process of the present invention comprises a welding burner, a control system for regulating the power of the welding burner, a voltage-measuring network connected between the electrode and the workpiece and generating a measured-value signal which can be supplied to a comparator for the control circuit, and a set-point generator for the arc voltage. The output of the latter is also supplied to the comparator and in addition, the system includes means for maintaining constant the distance between the electrode end and the level of the upper surfaces of the workpieces adjoining the welding bath or pool.

This device thus establishes a fixed spacing between the electrode end and the level of the pool-adjoining workpiece upper surfaces so that a set-point value for the arc voltage which corresponds to this spacing may be selected to yield the optimum welding conditions. The set-point value, selected in accordance with the last-mentioned distance, is compared to the actual-value signal representing the measured arc voltage. When the comparator generates an output signal indicating a difference between the set-point and actual-value signals, the control device regulates the power of the welding burner. In this manner, the upper level of the pool can be maintained substantially constant at least relative to the adjoining upper surfaces of the workpieces and the danger of breakthrough of the welding process is avoided.

The term "level of the upper surfaces of the workpieces" may be used herein to describe the line, in the plane of the burner and its arc-producing electrode which lies perpendicular to the direction of relative displacement of the welding crevice and the burner and extends across the crevice. The distance is measured between the end of the electrode and the point along this line directly beneath the electrode end. The critical spacing is measured at a point which corresponds to the mean of different heights of these workpiece surfaces.

BRIEF DESCRIPTION OF THE DRAWING

The above and other objects, features and advantages of the present invention will become more readily apparent from the following description, reference being made to the accompanying drawing in which the sole FIGURE is a partial bloc, diagram of a system for controlling the power of an arc-welding burner according to the invention with an electrical spacing-control system.

SPECIFIC DESCRIPTION

The electrical output which represents the spacing can also be applied as an input to a set-point generator 2. More particularly, an electrical sensor of this distance can be displaced along the upper surfaces of the workpieces adjoining the pool and can be connected in a feedback circuit for adjusting the weld burner.

The set-point generator 2 establishes, for a given spacing, corresponding set-point values for the arc voltage, these set-point values being applied to the comparator 4. Since the arc voltage is a function of the arc length, the unit 3 measures the arc voltage and applies a measured-value signal to the comparator 4. This measured-value signal represents the instantaneous distance between the end of the electrode and the upper surface of the pool of weldment. This actual-value signal, corresponding to the arc voltage, varies, for example, with a drop in the upper surface of the pool and therefore of the root of the bead of weldment for a given distance between the electrode end and the level of the pool-adjoining upper surfaces of the workpieces as established by the device 2.

The comparator 4 compares the set-point value from block 2 with the actual value from block 3 and produces an error signal or output upon the development of a difference between the set point value and the actual value of the arc voltage. This error or difference signal is applied as the control signal to a conventional control circuit 5 regulating the power of the welding burner. Preferably, the device 5 regulates the current amplitude. Naturally, the control device 5 can also represent other means for regulating the welding performance, for example, by varying other welding parameters such as the welding speed or the electrode-wire feed rate.

The drawing also shows electrical control of the position of the burner 114 so as to space the end 115 of the arc welectrode at the constant distance from the mean point 130 between the levels 121 and 121a of the upper surfaces of the workpieces 110 and 111. In this case, the rollers 120 and 120a are carried by rods 119 and 119a which displace the armatures of linear differential transformers 131 and 131a whose outputs are applied through amplifiers 132 and 132a to an averaging circuit 133. The linear differential transformers and the respective circuitry are described in SERVOMECHANISM PRACTICE, pages 67 ff, MCGRAW-HILL BOOK CO., New York (1960). The output of the averager is applied as a measured-value signal to a comparator 134 which also receives a set-point signal from a set-point generator 135 whose input represents the desired position of the burner 114 relative to the location 130.

The comparator 134 produces a signal which drives the servo-motor 136 and which also can be used to operate a controller regulating the parameters of the arc in the manner described. In this case, the motor 136 drives a pinion 138 which measures with a rack 139 correspondingly raising and lowering the burner 114.

The circuit this represents an electrical system for holding constant the distance between the electrode end and the level of the workpiece upper surfaces adjoining the welding bath 113a which is deposited in the crevice 112 and has an upper pool surface 113.

Since the electrode during the welding process does not move relative to the welding burner, the system shown in the drawing maintains constant the distance between the welding burner 114 and the level of the workpiece upper surfaces flanking the pool of weldment.

Because the electrode 115 does not move relative to the welding burner this corresponds to a constant distance between the non-consumable electrode end and the workpiece upper surfaces.

The system positions the electrode end at a level above the workpiece upper surfaces which is optimal for the welding operation to develop the pool of weldment at a level which is desirable for the particular welding operation.

The latter distance between the ideal pool surface and the electrode end corresponds to a setpoint value for the arc voltages which is provided by the setpoint generator 2, necessary because the setpoint value will be changed for different welding applications.

Arc voltage and arc length (distance between the electrode end and the pool of weldment) are practically proportional in the welding region. Thus, by measure of the instantaneous arc voltage with the device 3, the instantaneous distance between the electrode end and the welding pool can be and is measured.

The instantaneously measured value at 3 and the setpoint value at 2 are fed to the comparator 4 in which they are compared with one another.

Any difference represents a variation in the arc voltage and hence in the critical distance between the electrode end and the upper surface of the pool. This difference or error signal is applied to a control device 5 which varies the power of the burner. The control device 5 can vary any of the welding parameters which effect the power, usually the welding current. However, welding speed can also be varied for the same purpose. In other words, the control effectively restores the pool height relative to the levels of the upper workpiece surfaces in an approach quite different from that which has been used heretofore, the position of the electrode end being substantially fixed.

As the distance between the electrode end and the pool increase, corresponding to a reduced voltage, welding power is increased to restore the pool height and vice versa.

We claim:

1. In a process for controlling the power of an arc-welding burner having a nonconsumable electrode in dependence upon changes in the level of the upper surface of a pool of weldment deposited in a crevice between a pair of workpieces having upper workpiece surfaces and wherein a measured value of the relative position of the upper pool surface and a nonconsumable arc-generating electrode end of the burner is derived in the form of the arc voltage, the improvement which comprises the steps of:

maintaining the distance between said electrode end and a point representing the mean level of the workpiece surfaces adjoining the pool constant, said distance being maintained constant by electrically detecting the positions of said workpiece surfaces and electrically controlling the position of said electrode end in response to the electrically detected position of said workpiece surfaces;

continuously comparing said measured value with a setpoint valve representing an ideal spacing of the electrode end from the upper surface of the pool and producing an output representing the comparison; and controlling a welding parameter in response to said output and hence to variations in said arc voltage to increase welding power with decreasing arc voltage and decrease welding power with increasing arc voltage.

2. The improvement defined in claim 1 wherein the welding parameter is the welding current.

3. In a system for controlling the deposition of a pool of weldment by an arc-welding burner having a non-consumable arc-generating electrode end disposed above the level of said pool between a pair of upper surfaces of workpieces defining a crevice in which the pool is deposited, in combination:

a setpoint generator for generating a setpoint signal representing the desired value of the arc voltage;

means for measuring the actual value of the arc voltage and generating an actual value signal corresponding thereto;

a comparator connected to said means and to said generator for producing a control signal representing variation of the arc voltage and hence changes in the position of said upper surface of said pool relative to said electrode end;

means responsive to said control signal and connected to said comparator for controlling a welding parameter in response to said output and hence to variations in said arc voltage to increase welding power with decreasing arc voltage and decrease welding power with increasing arc voltage; and means between said burner and workpieces for maintaining the distance between said electrode end and a point representing the mean level of the upper workpiece surfaces adjoining said pool constant, said distance-maintaining means including electrical detector means responsive to the positions of said workpiece surfaces and circuit means controlling the position of said burner in response to said detector means.

* * * * *